United States Patent
Kim et al.

(10) Patent No.: US 9,148,217 B2
(45) Date of Patent: Sep. 29, 2015

(54) METHOD AND APPARATUS OF COMMUNICATION USING SUBFRAME BETWEEN BASE STATION AND RELAY

(75) Inventors: Hak-seong Kim, Seoul (KR); Eun Sun Kim, Anyang-si (KR); Byeong Geol Cheon, Seoul (KR); Joon Kui Ahn, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 803 days.

(21) Appl. No.: 12/536,418

(22) Filed: Aug. 5, 2009

(65) Prior Publication Data

US 2010/0034135 A1 Feb. 11, 2010

Related U.S. Application Data

(60) Provisional application No. 61/086,790, filed on Aug. 6, 2008.

(30) Foreign Application Priority Data

Jul. 15, 2009 (KR) .................. 10-2009-0064416

(51) Int. Cl.
*H04B 7/26* (2006.01)
*H04L 29/06* (2006.01)
*H04W 72/04* (2009.01)
*H04W 84/04* (2009.01)

(52) U.S. Cl.
CPC ............ *H04B 7/2606* (2013.01); *H04B 7/2656* (2013.01); *H04L 63/10* (2013.01); *H04W 72/044* (2013.01); *H04W 84/047* (2013.01)

(58) Field of Classification Search
None
See application file for complete search history.

(56) References Cited

U.S. PATENT DOCUMENTS

| 8,040,827 | B2 * | 10/2011 | Kwon et al. ................ 370/295 |
|---|---|---|---|
| 2003/0214919 | A1 * | 11/2003 | Kilfoyle et al. ............ 370/315 |
| 2005/0249137 | A1 * | 11/2005 | Todd et al. .................. 370/311 |
| 2006/0067325 | A1 * | 3/2006 | Kounavis et al. .......... 370/395.4 |
| 2007/0153734 | A1 * | 7/2007 | Lee et al. .................. 370/329 |
| 2007/0191065 | A1 * | 8/2007 | Lee et al. .................. 455/562.1 |
| 2007/0281613 | A1 * | 12/2007 | Lee et al. .................. 455/15 |
| 2008/0045144 | A1 * | 2/2008 | Fujita ........................ 455/7 |
| 2008/0056173 | A1 * | 3/2008 | Watanabe ................... 370/315 |
| 2008/0062902 | A1 | 3/2008 | Lou et al. |
| 2008/0068979 | A1 * | 3/2008 | Visotsky et al. ............ 370/208 |
| 2008/0069026 | A1 * | 3/2008 | Chan et al. ................. 370/315 |
| 2008/0090575 | A1 * | 4/2008 | Barak et al. ............... 455/444 |
| 2008/0095038 | A1 * | 4/2008 | Chang et al. ............... 370/208 |
| 2008/0107062 | A1 | 5/2008 | Viorel et al. |
| 2008/0108355 | A1 * | 5/2008 | Oleszcsuk .................. 455/442 |
| 2008/0132263 | A1 * | 6/2008 | Yu et al. .................... 455/515 |

(Continued)

OTHER PUBLICATIONS

R1-074616 to Huawei, published on Nov. 5-9, 2007, "MBSFN subframe allocation signaling".*

(Continued)

*Primary Examiner* — Dung B Huynh
(74) *Attorney, Agent, or Firm* — Lee, Hong, Degerman, Kang & Waimey (57) ABSTRACT

Provided is a communication method of a relay station in a wireless communication system, the communication method comprising the steps of configuring subframes dedicated for a backhaul link between a base station and the relay station and receiving a signal from the base station via the subframes dedicated for the backhaul link, wherein access of a legacy mobile station to at least a part of the subframes dedicated for the backhaul link is restricted.

6 Claims, 11 Drawing Sheets

(56) References Cited

U.S. PATENT DOCUMENTS

| | | | |
|---|---|---|---|
| 2008/0137584 A1* | 6/2008 | Oh et al. ..................... | 370/315 |
| 2008/0151809 A1* | 6/2008 | Chindapol et al. ............ | 370/315 |
| 2008/0159211 A1* | 7/2008 | Kwon et al. ................. | 370/329 |
| 2008/0181167 A1* | 7/2008 | Sydir et al. .................. | 370/315 |
| 2008/0181183 A1 | 7/2008 | Gale et al. | |
| 2008/0205323 A1* | 8/2008 | Kaneko et al. ............... | 370/315 |
| 2008/0247337 A1* | 10/2008 | Li et al. ........................ | 370/280 |
| 2008/0267110 A1* | 10/2008 | Cai et al. ...................... | 370/315 |
| 2008/0274746 A1* | 11/2008 | Lin et al. ...................... | 455/449 |
| 2008/0298296 A1* | 12/2008 | Wu ................................ | 370/315 |
| 2009/0116416 A1* | 5/2009 | Sekiya .......................... | 370/310 |
| 2009/0219841 A1* | 9/2009 | Sudarshan et al. ........... | 370/281 |
| 2009/0252075 A1* | 10/2009 | Ji et al. ......................... | 370/312 |
| 2009/0252077 A1* | 10/2009 | Khandekar et al. ........... | 370/312 |
| 2009/0257390 A1* | 10/2009 | Ji et al. ......................... | 370/329 |
| 2009/0323621 A1* | 12/2009 | Touboul et al. ............... | 370/329 |
| 2010/0008282 A1* | 1/2010 | Bhattad et al. ................ | 370/312 |
| 2010/0080139 A1* | 4/2010 | Palanki et al. ................ | 370/252 |
| 2010/0110964 A1* | 5/2010 | Love et al. .................... | 370/312 |
| 2010/0189081 A1* | 7/2010 | Zhang et al. .................. | 370/336 |
| 2010/0232546 A1* | 9/2010 | Yu et al. ........................ | 375/300 |
| 2010/0254301 A1* | 10/2010 | Blankenship et al. ........ | 370/315 |
| 2010/0271999 A1* | 10/2010 | Yu et al. ........................ | 370/312 |
| 2010/0316096 A1* | 12/2010 | Adjakple et al. .............. | 375/211 |
| 2011/0013554 A1* | 1/2011 | Koskinen ...................... | 370/315 |
| 2011/0038285 A1* | 2/2011 | Kwon et al. ................... | 370/281 |
| 2011/0103291 A1* | 5/2011 | Wiberg et al. ................ | 370/315 |
| 2011/0103338 A1* | 5/2011 | Astely et al. ................. | 370/329 |
| 2011/0194477 A1* | 8/2011 | Damnjanovic et al. ....... | 370/312 |
| 2011/0222428 A1* | 9/2011 | Charbit et al. ................ | 370/252 |
| 2011/0228742 A1* | 9/2011 | Honkasalo et al. ........... | 370/330 |
| 2011/0294508 A1* | 12/2011 | Min et al. ...................... | 455/436 |
| 2011/0299452 A1* | 12/2011 | Seo et al. ...................... | 370/315 |
| 2011/0317614 A1* | 12/2011 | Park et al. ..................... | 370/315 |
| 2012/0220214 A1* | 8/2012 | Du et al. ........................ | 455/7 |
| 2013/0070635 A1* | 3/2013 | Suo et al. ...................... | 370/252 |

OTHER PUBLICATIONS

R2-082192 to Alcatel-Lucent, published on May 5-9, 2008, "MBSFN subframe allocation for different service capacities".*

R2-087392 to Ericsson et al, published on Nov. 10-14, 2008, "Updated resposne to LS R2-086988 on sub-frame reservation for relays".*

3GPP TS 36.331 v8.2.0, published on May 2008.*

The State Intellectual Property Office of the People's Republic of China Application Serial No. 200980106731.1, Office Action dated Dec. 26, 2012, 8 pages.

Huawei, "MBSFN Subframe Allocation Signaling," 3GPP TSG-RAN-WG1 Meeting #51, R1-074616, Nov. 2007, 3 pages.

Alcatel-Lucent, "MBSFN subframe allocation for different service capacities," TSG-RAN2 #62, R2-082192, May 2008, 6 pages.

Korean Intellectual Property Office Application Serial No. 10-2009-0064416 Office Action dated Feb. 6, 2015, 4 pages.

Ericsson, "Self backhauling and lower layer relaying," TSG-RAN WG1 #53 bis, R1-082470, Jun. 2008, 3 pages.

LG Electronics, "Subframe Configuration for Relay Node Transmission and Reception in LTE-advanced FDD Mode," 3GPP TSG RAN WG1 Meeting #55bis, R1-090221, Jan. 2009, 4 pages.

European Patent Office Application Serial No. 09805154.3, Search Report dated Nov. 14, 2014, 11 pages.

\* cited by examiner

METHOD AND APPARATUS OF COMMUNICATION USING SUBFRAME BETWEEN BASE STATION AND RELAY

CROSS-REFERENCE TO RELATED APPLICATIONS

Pursuant to 35 U.S.C. §119, this application claims the benefit of earlier filing date and right of priority to Korean Patent Application No. 10-2009-0064416, filed on Jul. 15, 2009, and also claims the benefit of U.S. Provisional Application No. 61/086,790, filed on Aug. 6, 2008, the contents of which are all hereby incorporated by reference herein in their entireties.

BACKGROUND

1. Technical Field

The present invention relates to wireless communication, and more particularly, to a method of communication in a wireless communication system comprising a relay.

2. Related Art

Wireless communication systems are widely used to provide various type of communication services such as voice and data. The wireless communication systems are multiple access systems capable of sharing available radio resources and supporting communication with multiple users. For example, the radio resources are time, frequency, codes, transmission power, etc. Examples of multiple access systems include a TDMA (Time Division Multiple Access) system, a CDMA (Code Division Multiple Access) system, an FDMA (Frequency Division Multiple Access) system, an OFDMA (Orthogonal Frequency Division Multiple Access) system, an SC-FDMA (Single Carrier-Frequency Division Multiple Access) system, etc. The TDMA system uses time as radio resources, the FDMA system uses frequencies as radio resources, the CDMA system uses codes as radio resources, and the OFDMA system uses subcarriers and time as radio resources. Furthermore, the wireless communication systems support bidirectional communication. Bidirectional communication can be performed using a TDD (Time Division Duplex) mode, an FDD (Frequency Division Duplex) mode, an H-FDD (Half-Frequency Division Duplex) mode, etc. According to the TDD mode, uplink transmission and downlink transmission are divided by time resources. According to the FDD mode, uplink transmission and downlink transmission are divided by frequency resources. According to the H-FDD mode, uplink transmission and downlink transmission are divided by combination of time resources and frequency resources.

A wireless communication system includes a base station that provides service to a cell which is a certain area. The quality of a signal transmission is affected by a variation of wireless environments in terms of characteristic of wireless transmission technology. Particularly, radio channels vary with time due to various types of scatters and movement of mobile stations. Furthermore, receive power abruptly decreases as a distance between wireless communication subjects increases, and thus the distance is restricted. Accordingly, a mobile station can communicate with a base station when the mobile station is located in the coverage of the base station, in general. As described above, a maximum transmission rate between a mobile station and a base station, throughput of a user in a cell and throughput of the entire cell decrease due to scatters, the moving speed of the mobile station, a distance between transmitting and receiving sides, etc. For example, if the mobile station is located on the boundary of the cell or an obstacle such as a building exists between the mobile station and the base station, the quality of communication between the mobile station and the base station may be poor.

To solve the aforementioned problem, various techniques for compensating for degradation of transmission signals between the base station and the mobile station are introduced to improve a maximum transmission rate and throughput and extend the coverage of the base station. One of the various techniques is introduction of a relay station in a wireless communication system. For instance, LTE (Long Term Evolution)-Advanced that is one of potent candidates of IMT (International Mobile Telecommunication)-Advanced corresponding to a next-generation mobile communication system following third-generation mobile communication systems includes a relay station. The relay station relays signals between a base station and a mobile station. The relay station can extend the coverage of the base station and improve cell throughput.

The relay station has been recently introduced, and thus a legacy mobile station designed without considering the relay station and a new mobile station designed in consideration of the relay station coexist in a wireless communication system including the relay station. Accordingly, a method for maintaining backward compatibility for the legacy mobile station is required.

SUMMARY

An object of the present invention is to provide backward compatibility for a legacy mobile station that is designed without considering a relay station.

According to an aspect of the present invention, there is provided a communication method of a relay station in a wireless communication system, the communication method comprising the steps of configuring subframes dedicated for a backhaul link between a base station and the relay station and receiving a signal from the base station via the subframes dedicated for the backhaul link, wherein access of a legacy mobile station to at least a part of the subframes dedicated for the backhaul link is restricted.

The part of the subframes dedicated for the backhaul link to which access of the legacy mobile station may be restricted corresponds to MBSFN (Multimedia Broadcast multicast service Single Frequency Network) subframe.

The method may further comprise the step of transmitting a signal for indicating the subframes dedicated for the backhaul link to a mobile station.

The signal may be transmitted through one of 6-bit bitmap, 10-bit bitmap and 24-bit bitmap.

The signal may be transmitted by a system information block (SIB).

The relay station may not transmit any signal to the mobile station when the relay station receives the signal from the base station through the subframes dedicated for the backhaul link.

The subframes dedicated for the backhaul link may be configured among subframes other than subframes through that at least one of a synchronous signal, a broadcast signal and a paging signal is transmitted to mobile stations.

The same frequency band may be used for the backhaul link between the base station and the relay station and an access link between the relay station and a mobile station.

According to another aspect of the present invention, there is provided a communication method of a base station in a wireless communication system, the communication method comprising the steps of configuring subframes dedicated for a backhaul link between the base station and a relay station and transmitting data to the relay station via the subframes dedicated for the backhaul link, wherein access of a legacy mobile station to at least a part of the subframes dedicated for the backhaul link is restricted.

The method may further comprise the step of transmitting a signal for indicating the subframes dedicated for the backhaul link to the relay station via the backhaul link.

The method may further comprise the step of transmitting a signal for indicating the subframes dedicated for the backhaul link to the legacy mobile station through the relay station.

According to an aspect of the present invention, there is provided a mobile station comprising an RF (Radio Frequency) unit transmitting/receiving radio signals and a processor which is configured not to perform channel measurement in at least a part of subframes dedicated for a backhaul link when information on the subframes dedicated for the backhaul link is received from a base station or a relay station.

According to an aspect of the present invention, there is provided a mobile station comprising an RF unit transmitting/receiving radio signals and a processor which is configured to overhear a signal transmitted through a backhaul link in subframes dedicated for a backhaul link when information on the subframes for the backhaul link is received from a base station or a relay station.

A backword compatibility for the legacy mobile station is obtained. Especially, an incorrect channel measurement of the legacy mobile station is prevented.

DESCRIPTION OF EXEMPLARY EMBODIMENTS

Techniques described below can be used for a variety of wireless communication systems such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier-Frequency Division Multiple Access) and MC-FDMA (Multi Carrier-Frequency Division Multiple Access) systems. CDMA can be implemented by radio technology such as UTRAN (Universal Terrestrial Radio Access Network) or CDMA2000. TDMA can be implemented by radio technology such as GSM (Global System for Mobile Communications)/GPRS (General Packet Radio Service)/EDGE (Enhanced Data rates for GSM Evolution). OFDMA can be implemented by radio technology such as IEEE 802.11 (Wi-Fi), IEEE 802.16 (WiMAX), IEEE 802-20 or evolved UTRA (E-UTRA). UTRA is a part of UMTS (Universal Mobile Telecommunications System). 3GPP (3rd Generation Partnership Project) LTE (Long Term Evolution) is a part of E-UMTS (Evolved UMTS) using E-UTRA, and it employs OFDMA for downlink and employs SC-FDMA for uplink.

Although the present invention will be described based on 3GPP LTE-Advanced for clarity of explanation, the technical spirit of the present invention is not limited thereto. 3GPP LTE-Advanced (referred to as LTE-A hereinafter) is evolved from 3GPP LTE (referred to as LTE hereinafter).

Figure 1:
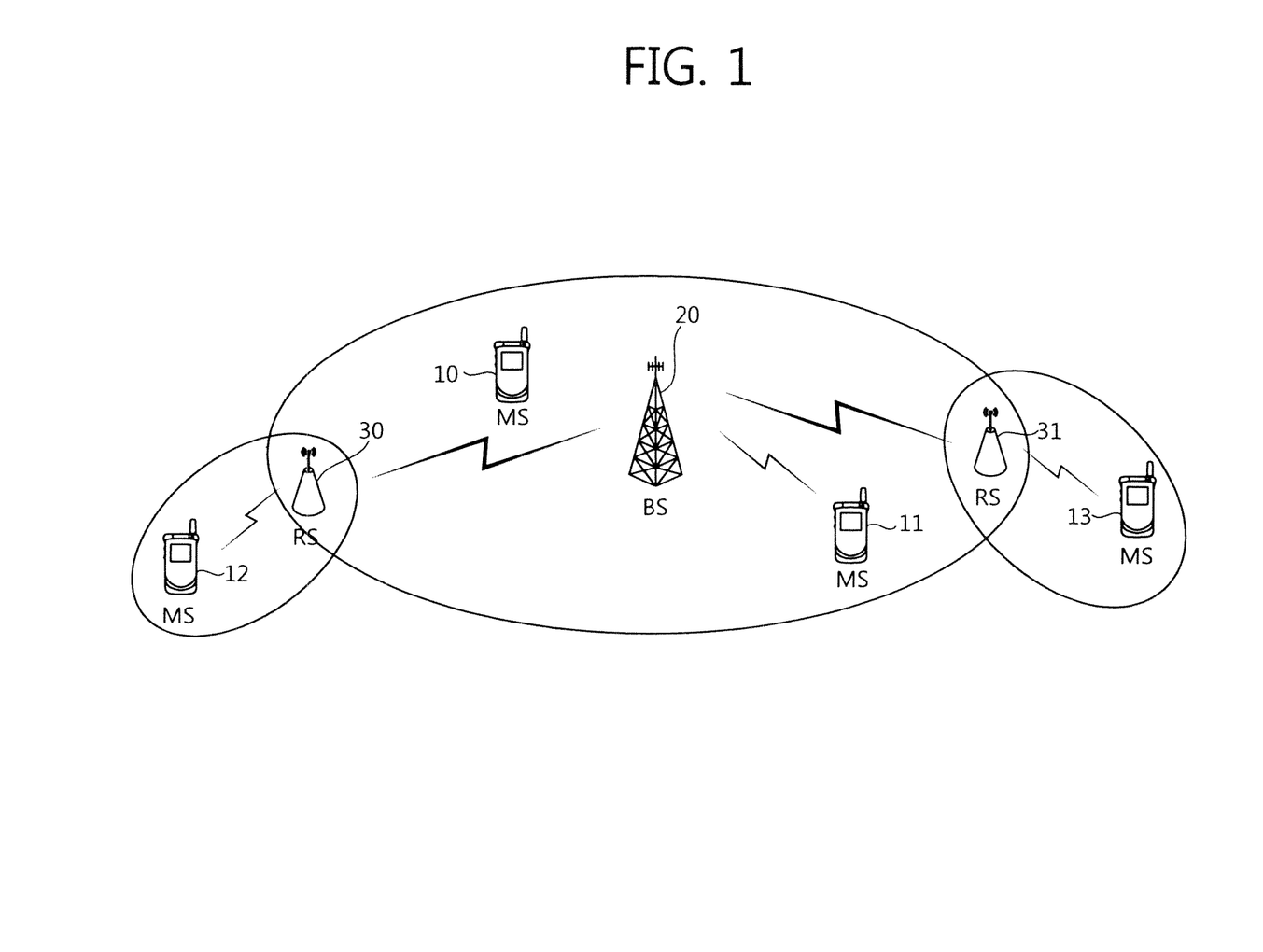
FIG. 1 illustrates a wireless communication system including a relay station.

FIG. 1 illustrates a wireless communication system including a relay station. The wireless communication system is widely deployed to provide a variety of communication services, such as voices, packet data, etc.

Referring to FIG. 1, the wireless communication system includes one or more mobile stations 10, 11, 12 and 13, a base station 20 and one or more relay stations 30 and 31. The mobile stations 10, 11, 12 and 13 can be fixed or mobile and referred to as another terminology, such as a user equipment (UE), a user terminal (UT), a subscriber station (SS) and a wireless device (or wireless station), etc. The base station 20 is a fixed station communicating with the mobile stations 10, 11, 12 and 13 and can be referred to as another terminology, such as a node-B, a base transceiver system (BTS), an access point, etc. There are one or more cells within the coverage of the BS 20. The relay stations 30 and 31 are used to extend coverage or improve a transmission speed according to diversity effect and located between the base station and mobile stations. The relay station may be referred to as another terminology, such as a relay node (RN), a repeater, relay, etc. That is, the mobile stations 10 and 11 located in the coverage of the base station 20 can directly communicate with the base station 20 and the mobile stations 12 and 13 located outside the coverage of the base station 20 can communicate with the base station via the relay stations 30 and 31. Even the mobile stations 10 and 11 located in the coverage of the base station 20 can communicate with the base station 20 via the relay stations 30 and 31 to improve transmission speeds according to diversity effect.

Relay stations can be classified according to function as follows.

TABLE 1

| Function | L1 Relay | L2 Relay | L3 Relay | Pico/Femto Cell |
|---|---|---|---|---|
| RF function | X | X | X | X |
| Coder/Decoder and CRC | — | X | X | X |
| HARQ | — | X | X | X |
| Multiplex & Demultiplex of MAC SDU | — | X | X | X |
| Priority(Qos) handling | — | X | X | X |
| Scheduling | — | X | X | X |
| Outer ARQ | — | (X) | X | X |
| (Re)-Segmentation and concatenation | — | (X) | X | X |
| Header | — | — | — | X |

TABLE 1-continued

| Function | L1 Relay | L2 Relay | L3 Relay | Pico/Femto Cell |
|---|---|---|---|---|
| compression(ROHC) | | | | |
| Reordering of lower layer SDUs | — | — | — | X |
| In-sequence delivery of upper layer PDUs | — | — | — | |
| Duplicate detection of lower layer SDUs | — | — | — | X |
| Ciphering | — | — | — | X |
| System information broadcast | — | — | X | X |
| RRC Connection set-up and maintenance | — | — | X | X |
| Radio Bearers set-up and maintenance | — | — | — | X |
| Mobility function | — | — | X | |
| MBMS services control | — | — | — | X |
| Paging | — | — | — | X |
| QoS management | — | — | (X) | X |
| UE measurement reporting and control the reporting | — | — | (X) | X |
| NAS signaling handling | — | — | — | X |

In Table 1, 'X' represents that a corresponding function is supported, represents that a corresponding function is not supported, and '(X)' represents that a corresponding function may be supported or not. Though the relay stations are classified into L1 relay station, L2 relay station and L3 relay station in Table 1, it is exemplary. This classification is classified according to rough characteristics. For reference, Table 1 represents functions of a femto cell and a pico cell in addition to functions of L1, L2 and L3 relay stations. It is assumed that the femto cell and the pico cell support all the functions represented in Table 1. The L1 relay station has AF (Amplify and Forward) function and some additional functions, amplifies a signal received from a base station or a mobile station and transmits the amplified signal to another mobile station or the base station. The L2 relay station has DF (Decoding and Forward) and scheduling functions, demodulates and decodes a signal received from a base station or a mobile station to restore information, codes and modulates the information to generate a signal and transmits the signal to another mobile station or the base station. The L3 relay station has a form similar to a single cell and the same functions as those of the L2 relay station and supports Ho-connection, Ho-disconnection and mobility function. The L3 relay station, the femto cell and the pico cell can change a whole or part of a frame structure. That is, the L3 relay station, the femto cell and the pico cell are relay stations capable of controlling relay cells. On the other hand, the L1 and L2 relay stations cannot change the whole or part of the frame structure. That is, the L1 and L2 relay stations are relay stations that cannot control relay cells. Accordingly, the L1 and L2 relay stations relay only data and a base station directly transmits a control channel to a mobile station. Relay stations mean L1, L2, L3 relay stations, pico cell and femto cell if there is no restriction on the relay stations in the specification.

The relay station can transmit or receive data by using radio resources. Radio resources that can be used by the relay station include time resources, frequency resources and space resources. The time resources are represented as subframes, symbols and slots and the frequency resources are represented as subcarriers, resource blocks and component carriers. The space resources are represented as spatial multiplexing and antennas. The radio resources can be exclusively used or shared between a base station and a relay station and between a relay station and a mobile station.

A link between a base station and a relay station is referred to as a backhaul link and a link between a relay station and a mobile station is referred to as an access link. The backhaul link between the base station and the relay station can be operated in a FDD mode or a TDD mode. The access link between the relay station and the mobile station can be also operated in the FDD mode or TDD mode.

Figure 2:
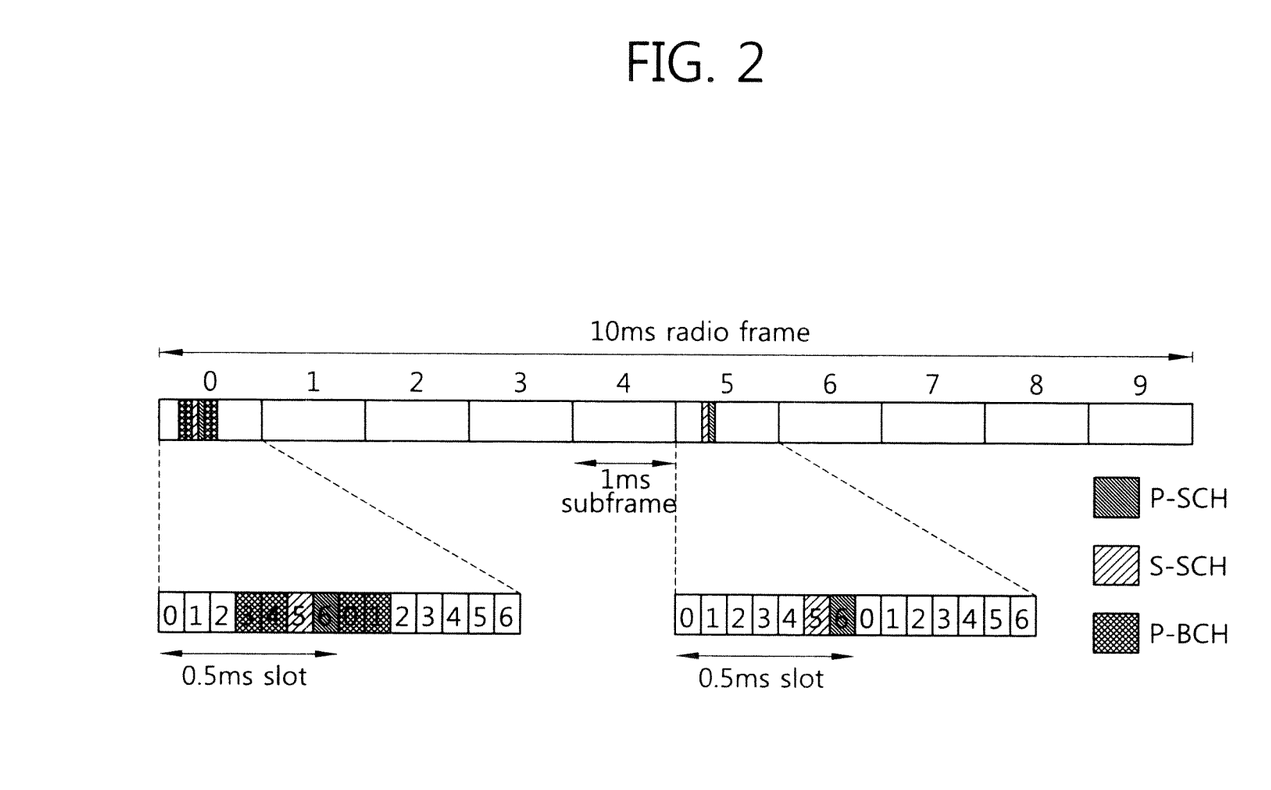
FIG. 2 illustrates an example of a structure of a radio frame.

FIG. 2 illustrates an example of a structure of a radio frame. The radio frame uses a normal CP (Cyclic Prefix).

Referring to FIG. 2, the radio frame includes 10 subframes. A subframe may include two slots. A slot may include a plurality of OFDM symbols in the time domain. The number of OFDM symbols included in the slot can be determined based on a CP structure. In a radio frame using a normal CP length, a slot may include 7 OFDM symbols. When the OFDM symbol length is 2048 Ts in a radio frame having a size of 10 ms, a normal CP length may be 144 Ts. Here, $Ts=1/(15000*2048)$ sec.

P-SCH (Primary Synchronization Channel) is located at the last OFDM symbols of the 0th slot and the 10th slot. The same PSS (Primary Synchronization Signal) is transmitted via two P-SCHs. The P-SCH is used to achieve time domain synchronization such as OFDM symbol synchronization and slot synchronization and/or frequency domain synchronization. ZC (Zadoff-Chu) sequence may be used as the PSS and a wireless communication system includes at least one PSS.

S-SCH (Secondary Synchronization Channel) is located at OFDM symbols right before the last OFDM symbols of the 0th slot and the 10th slot. S-SCH and P-SCH may be located at contiguous OFDM symbols. Different SSSs (Secondary Synchronization Signals) are transmitted via two S-SCHs. The S-SCH is used to obtain frame synchronization and/or CP configuration of a cell, that is, information on use of a normal CP or extended CP. A single S-SCH uses two SSSs. SSS may use m-sequence. That is, the single S-SCH includes two m-sequences. For example, if the single S-SCH includes 63 subcarriers, two m-sequences each of which has a length of 31 are mapped to the single S-SCH.

The P-SCH and S-SCH are used to obtain physical-layer cell identifies (ID). The physical-layer cell ID can be represented by 168 physical-layer cell ID groups and 3 physical layer IDs belonging to the physical-layer cell ID groups. That is, the total number of physical-layer cell IDs is 504, there are 168 physical-layer cell ID groups, and 3 physical layer IDs are included in each of the physical-layer cell ID groups. The P-SCH may use 3 ZC sequence root indexes indicating physical-layer IDs and the S-SCH may use 168 m-sequence indexes indicating physical-layer cell ID groups.

P-BCH (Physical-Broadcast Channel) is located in the 0th subframe of the radio frame. The P-BCH occupies 4 OFDM symbols including the third OFDM symbol and OFDM symbols other than the OFDM symbols occupied by the P-SCH and S-SCH in the 0th subframe. The P-BCH is used to obtain basic system configuration information of the corresponding base station. A period of the P-BCH may be 40 ms.

The radio frame structure shown in FIG. 2 is exemplary and the number of subframes included in the radio frame and the number of slots included in the subframes can be varied.

Figure 3:
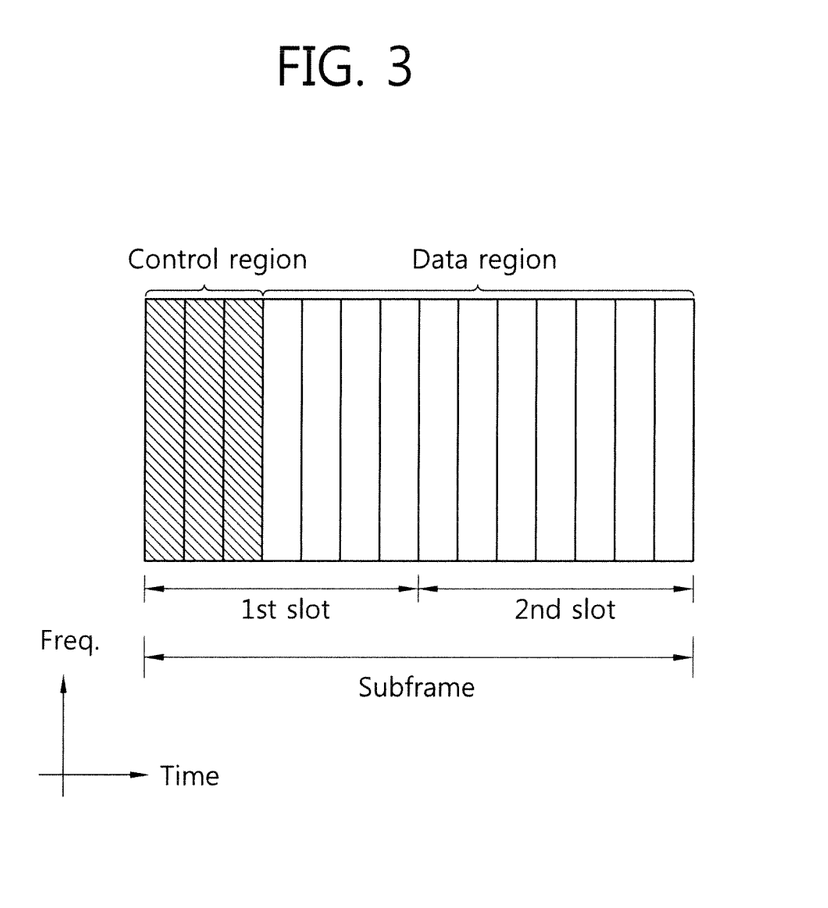
FIG. 3 illustrates a structure of a downlink subframe.

FIG. 3 illustrates a structure of a downlink subframe. The subframe includes two slots in the time domain. Maximum three OFDM symbols at the head of the first slot correspond to a control region on which control channels are allocated and other OFDM symbols correspond to a data region on which PDSCH (Physical Downlink Shared Channel) is allocated.

Downlink control channels used in 3GPP LTE include PCFICH (Physical Control Format Indicator Channel), PDCCH (Physical Downlink Control Channel), PHICH (Physical Hybrid-ARQ Indicator Channel), etc. PCFICH transmitted via the first OFDM symbol of the subframe loads information on the number of OFDM symbols (that is, the size of the control region) used to transmit control channels in the subframe. Control information transmitted via PDCCH is referred to as downlink control information (DCI). The DCI includes uplink resource allocation information, downlink resource allocation information and an uplink transmission power control command for arbitrary UE groups. PHICH carries ACK (Acknowledgement)/NACK (Not-Acknowledgement) signals for uplink HARQ (Hybrid Automatic Repeat Request). That is, ACK/NACK signals for uplink data transmitted from a mobile station are transmitted via the PHICH.

Figure 4:
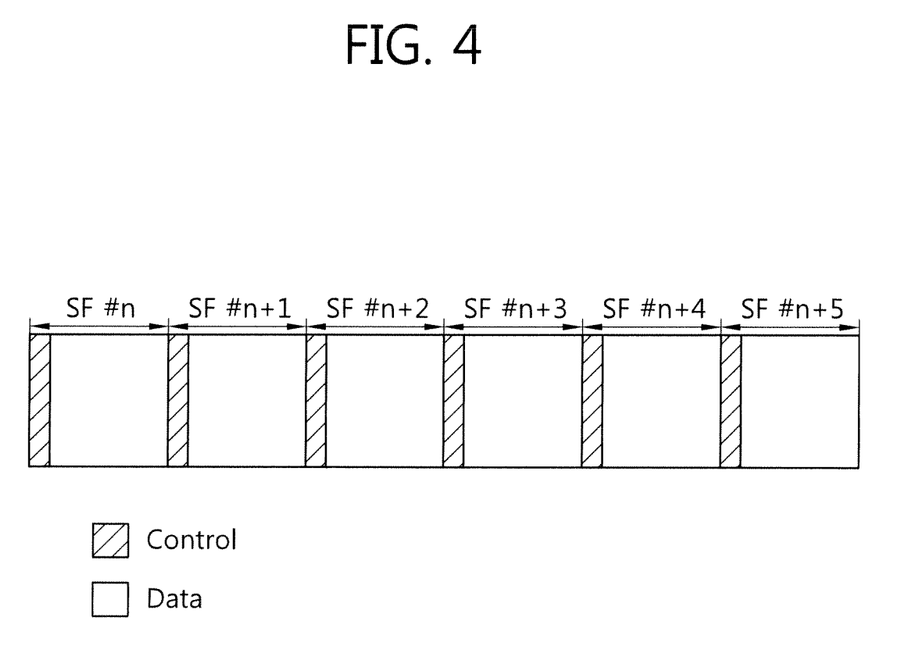
FIG. 4 illustrates an example of a frame for link between a base station and a mobile station.

FIG. 4 illustrates an example of a frame for a link between a base station and a mobile station.

Referring to FIG. 4, a subframe includes a control region transmitting control information and a data region transmitting data. Accordingly, most parts of system operation are performed based on subframes. A frame unit such as a radio frame includes a certain number of subframes. In a wireless communication system without including a relay station, every subframe is allocated for a mobile station communicating with a base station. The structure of an uplink frame is similar to that of a downlink frame.

Meanwhile a backhaul link between a base station and a relay station and an access link between the relay station and a mobile station in certain cells can share frequency resources. Here, it is difficult for the relay station to receive a signal from the base station via the backhaul link and, at the same time, transmit a signal to the mobile station via the access link because the signal received by the relay station via the backhaul link and the signal transmitted from the relay station via the access line interfere with each other to result in signal distortion. This is called self-interference. Accordingly, when the base station transmits a signal to the relay station via the backhaul link, the operation of the mobile station connected to the relay station is problematic. A new mobile station (referred to as LTE-A mobile station hereinafter) designed in consideration of a relay station has capability of overhearing signals transmitted via the backhaul link based on configuration and operates based on a procedure specified by specifications. It is assumed that the LTE-A mobile station can communicate with a relay station as well as a base station in this specification. However, a legacy mobile station (referred to as LTE mobile station corresponding to a mobile station based on Release 8) designed without considering a relay station is not able to know the existence of the relay station. If channel measurement is attempted at the time when a signal is transmitted from the base station to the relay station via the backhaul link, an inaccurate channel measurement result may be obtained due to a difference of reference signals structures. Furthermore, the base station may perform wrong scheduling. Accordingly, it is desirable that the LTE mobile station does not perform channel measurement when a signal is transmitted via the backhaul link.

Figure 5:
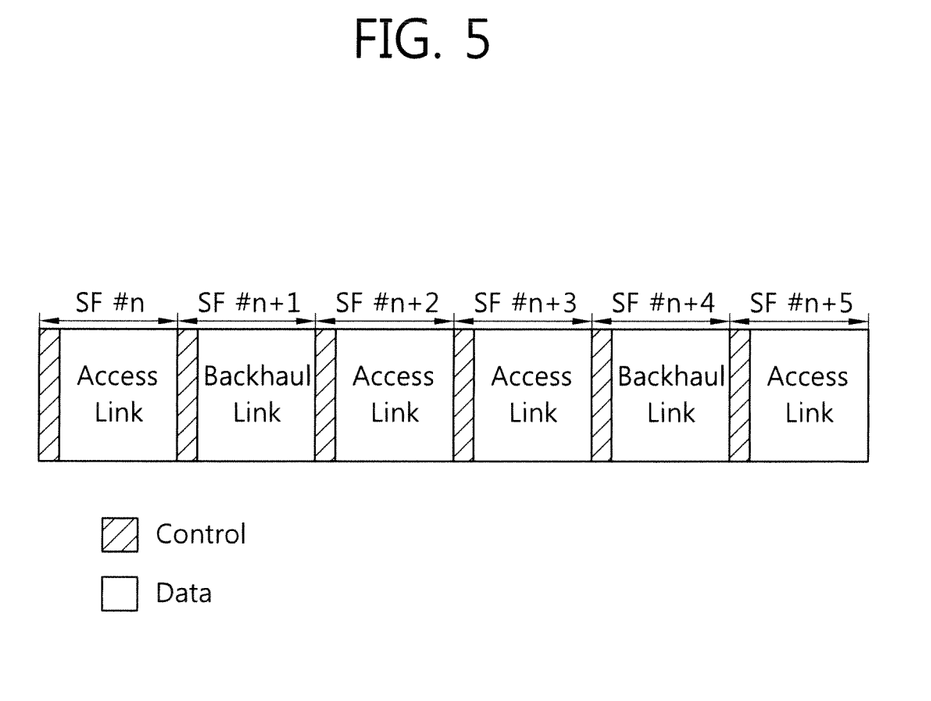
FIG. 5 illustrates a resource allocation method according to an embodiment of the present invention.

FIG. 5 illustrates a resource allocation method according to an embodiment of the present invention. Though FIG. 5 illustrates downlink transmission for convenience of explanation, the technical spirit of the present invention can be applied to uplink transmission.

Referring to FIG. 5, subframes #n, #n+2, #n+3 and #n+5 are configured as subframes dedicated for an access link and subframes #n+1 and #n+4 are configured as subframes dedicated for a backhaul link. In this manner, some subframes in a frame can be allocated for the access link and the other subframes can be allocated for the backhaul link.

Figure 6:
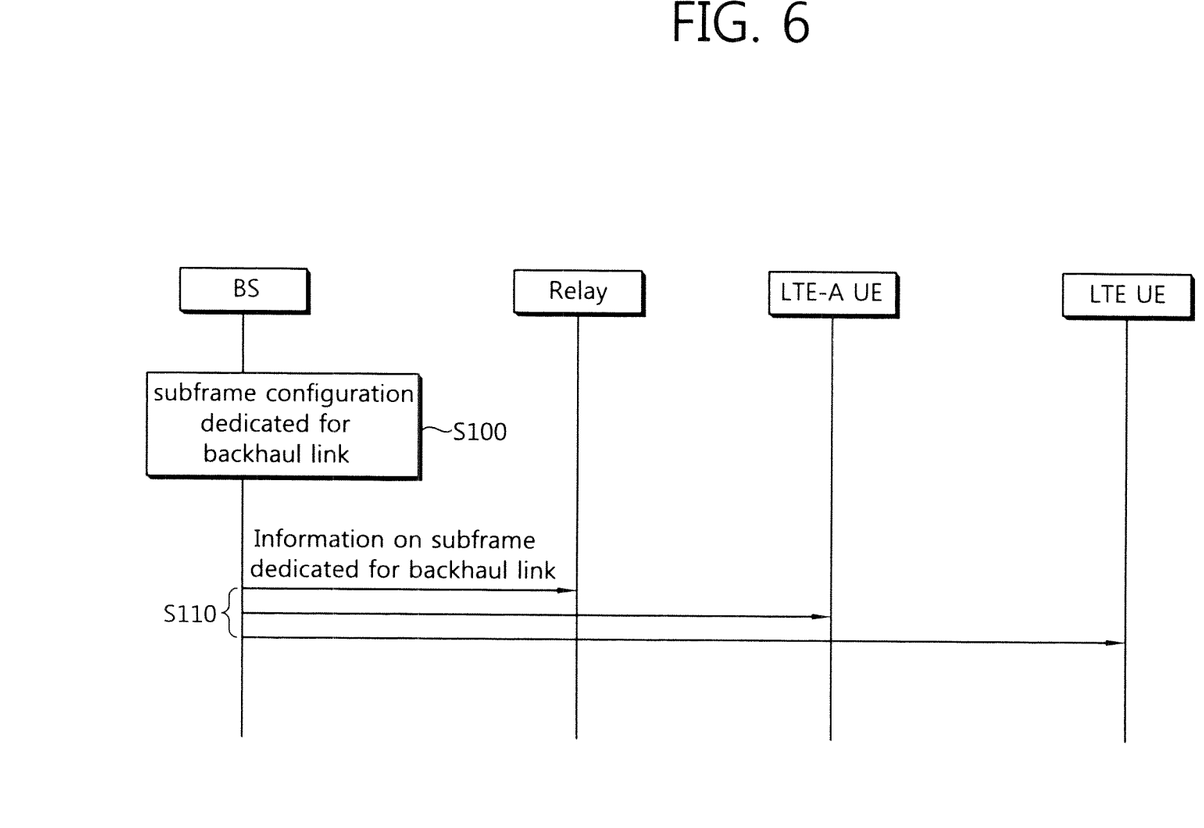
FIG. 6 is a flowchart showing a resource allocation method for a backhaul link according to an embodiment of the present invention.

FIG. 6 is a flowchart showing a resource allocation method for a backhaul link according to an embodiment of the present invention.

Referring to FIG. 6, a base station configures subframes dedicated for the backhaul link (step S100). For example, the subframes dedicated for the backhaul link may mean subframes configured such that downlink signals are transmitted from the base station to a relay station. The subframes dedicated for the backhaul link can be appropriately configured through signaling between the base station and the relay station, between the base station and a mobile station and between the relay station and the mobile station. The subframes dedicated for the backhaul link may be configured such that the subframes are periodically repeated in a frame. For example, the subframes dedicated for the backhaul link may be configured such that the subframes are periodically repeated for every k subframes. Furthermore, the subframes dedicated for the backhaul link may be configured such that the subframes are non-periodically repeated in the frame. That is, specific subframes in the frame may be configured as subframes dedicated for the backhaul link.

When the subframes dedicated for the backhaul link are configured such that the subframes are periodically or non-periodically repeated in the frame, the base station may transmit a signal for indicating the subframes dedicated for the backhaul link to the relay station via backhaul link. And the base station may transmit a signal for indicating the subframes dedicated for the backhaul link to a mobile station (hereinafter, a mobile station represents an LTE mobile station and LTE-A mobile station if the mobile station is not particularly specified) through the relay station (step S110). Here, the base station can signal the signal by a bitmap. For example, when first, second, fifth, sixth, ninth and tenth subframes in a radio frame including ten subframes are configured as subframes dedicated for the backhaul link, a bitmap '1100110011' can be signaled. The method of signaling the information through a bitmap is exemplary and the base station can signal the information based on various methods.

Figure 7:
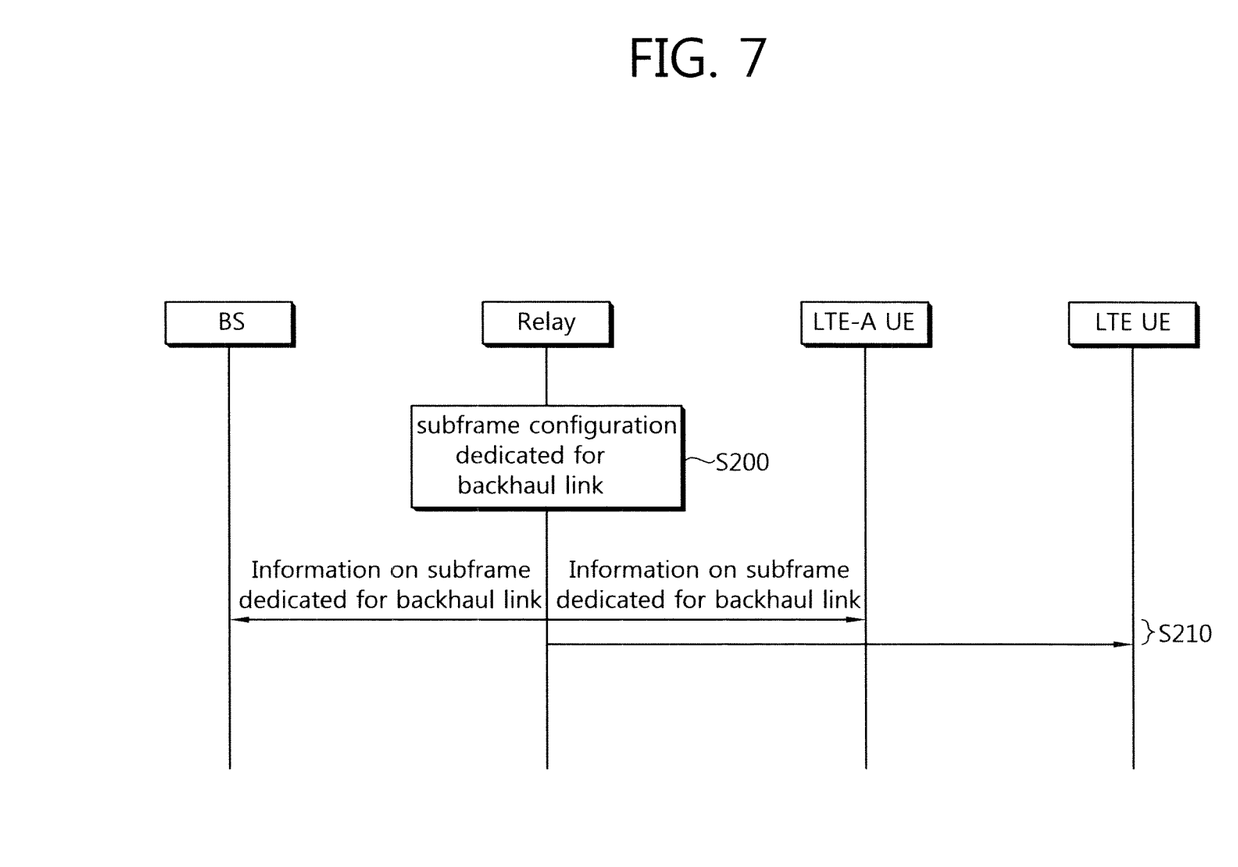
FIG. 7 is a flowchart showing a resource allocation method for a backhaul link according to another embodiment of the present invention.

FIG. 7 is a flowchart showing a resource allocation method for a backhaul link according to another embodiment of the present invention.

Referring to FIG. 7, a relay station configures subframes dedicated for the backhaul link (step S200). For example, the subframes dedicated for the backhaul link may be configured such that downlink signals are transmitted from a base station to the relay station. Here, the subframes dedicated for the backhaul link may be appropriately configured through signaling between the base station and the relay station, between the base station and a mobile station and between the relay station and the mobile station. The subframes dedicated for the backhaul link may be configured such that the subframes are periodically repeated in a frame. For example, the subframes dedicated for the backhaul link may be configured such that the subframes are periodically repeated for every k subframes. Furthermore, the subframes dedicated for the backhaul link may be configured such that the subframes are non-periodically repeated in the frame. That is, specific subframes in the frame may be configured as subframes dedicated for the backhaul link.

When the subframes dedicated for the backhaul link are configured such that the subfarmes are periodically or non-periodically repeated in the frame, the relay station may transmit a signal for indicating the subframes dedicated for the backhaul link to the mobile station (step S210). Here, the relay station can transmit the signal by a bitmap. For example, when first, second, fifth, sixth, ninth and tenth subframes in a radio frame including ten subframes are configured as subframes dedicated for the backhaul link, a bitmap '1100110011' can be signaled. The method of signaling the information through the bitmap is exemplary and the relay station can signal the information based on various methods.

To configure subframes dedicated for a backhaul link and signal information on the subframes, conventional methods may be used. For example, MBSFN (Multimedia Broadcast multicast service Single Frequency Network) subframe can be used. MBSFN can be referred variously, such as "Multi-Media Broadcast over a Single Frequency Network", "MBMS (Multimedia Broadcast/multicast) over a Single Frequency Network", "MBMS Single Frequency Network", "Multicast/Broadcast over a Single Frequency Network", "Multicast broadcast single frequency network" and "Multicast broadcast single frequency network". The MBSFN subframe may include a control region and a data region. For example, two leading OFDM symbols in the MBSFN subframe may be allocated for the control region and the other OFDM symbols may be allocated for the data region. Accessibility to the control region and the data region of the MBSFN subframe varies according to mobile station. In an example, both the LTE mobile station and LTE-A mobile station can access the control region of the MBSFN subframe and only the LTE-A mobile station can access the data region of the MBSFN subframe. In another example, only the LTE-A mobile station can access the whole region of the MBSFN subframe.

Figure 8:
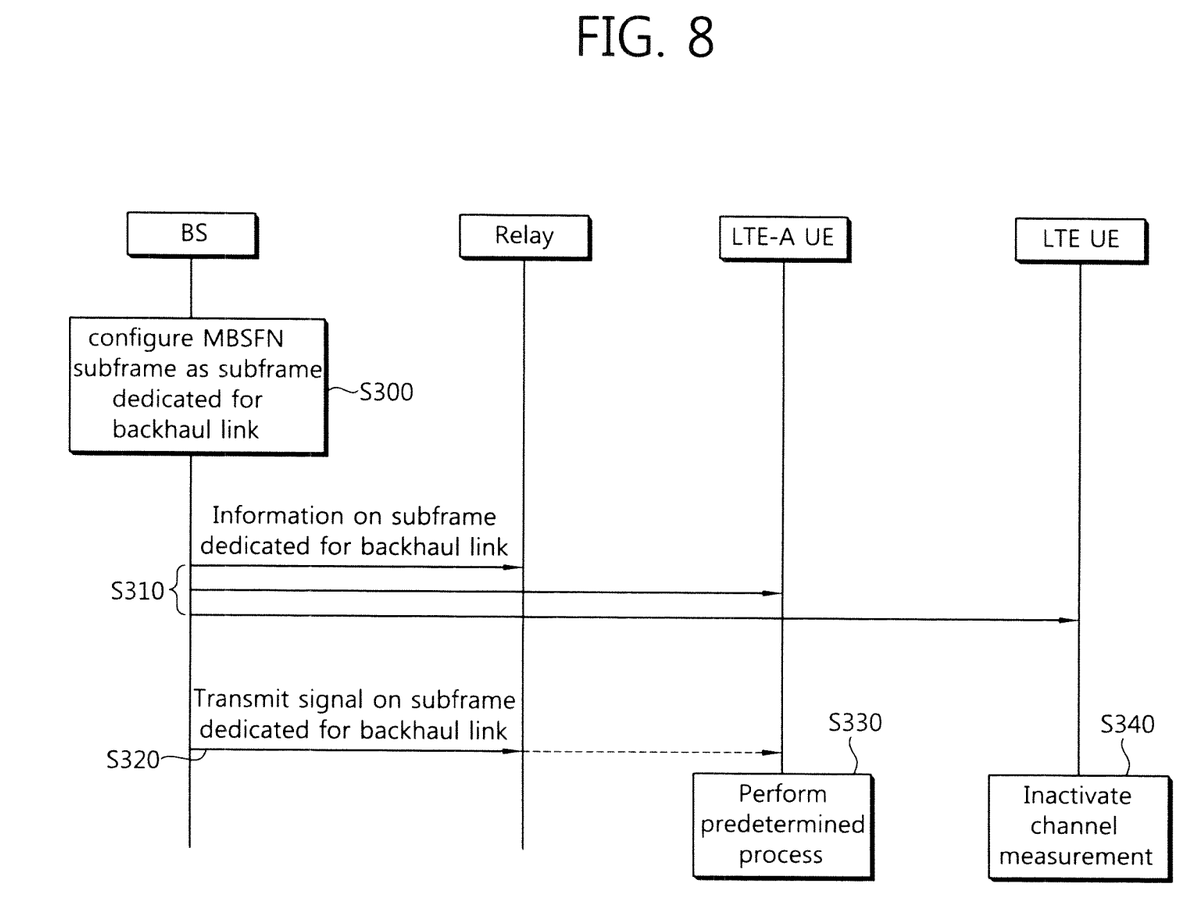
FIG. 8 is a flowchart showing a communicating method using a subframe between a base station and a relay station according to an embodiment of the present invention.

FIG. 8 is a flowchart showing a communication method using a subframe between a base station and a relay station according to an embodiment of the present invention. It is assumed that a backhaul link between the base station and the relay station and an access link between the relay station and a mobile station use the same frequency band.

Referring to FIG. 8, the base station configures subframes dedicated for the backhaul link between the base station and the relay station (step S300). For example, the subframes dedicated for the backhaul link may be configured such that downlink signals are transmitted from the base station to the relay station. The base station can configure MBSFN subframes as the subframes dedicated for the backhaul link.

Here, the base station can consider a subframe including a control signal which must be transmitted from the base station or the relay station to mobile stations. That is, the base station can configure some of subframes other than the subframe including the control signal which must be transmitted to the mobile stations as the subframes dedicated for the backhaul link. For example, the control signal which must be transmitted to the mobile stations includes a synchronization signal, a broadcasting signal and a paging signal. The synchronization signal, the broadcasting signal and the paging signal may be transmitted through 0, 4, 5 and 9 subframes among the 0, 1, 2, 3, 4, 5, 6, 7, 8, 9 subframes in a frame. Accordingly, some of the 1, 2, 3, 6, 7 and 8 subframes can be configured as the subframes dedicated for the backhaul link.

The base station informs the relay station of information for representing the subframes dedicated for the backhaul link via backhaul link. And the base station informs the mobile stations of information for representing the subframes dedicated for the backhaul link through the relay station (step S310). In one example, the information representing the subframes dedicated for the backhaul link may be transmitted through a bitmap. When some of the 0, 1, 2, 3, 4, 5, 6, 7, 8, 9 subframes in the frame are configured as the subframes dedicated for the backhaul link, the base station can transmit a 10-bit bitmap as the information representing the subframes dedicated for the backhaul link. In another example, when the subframes dedicated for the backhaul link is configured among MBSFN subframes, the information representing the subframes dedicated for the backhaul link may be transmitted to the mobile stations by signaling (referred to as MBSFN signaling hereinafter) indicating the MBSFN subframes. The MBSFN signaling can be performed through a system information block (SIB). Table 2 represents an example of the system information block for MBSFN signaling.

TABLE 2

```
ConfigIE ::= {
    Period           ,
    AllocationOffset    INTEGER (0..7),
    Allocation          CHOICE {
        oneFrame                BITMAP (SIZE(6)),
        fourFrame               BITMAP (SIZE(24))
    }
}
```

Configuration information for MBSFN signaling may include the period of a radio frame on which the MBSFN subframe is allocated, radio frame offset (AllocationOffset) and MBSFN subframe allocation information (Allocation). The MBSFN subframe allocation information can be represented as 6 bits when the MBSFN subframe is allocated on every single frame. It can be represented as 24 bits when the MBSFN subframe is allocated on every four frames. The 0, 4, 5 and 9 subframes among the 0, 1, 2, 3, 4, 5, 6, 7, 8, 9 subframes in the frame must transmit a control signal. Accordingly, when some of the 1, 2, 3, 6, 7 and 8 subframes other than the 0, 4, 5 and 9 subframes are configured as the subframes dedicated for the backhaul link, the information representing the subframes dedicated for the backhaul link can be represented as 6 bits and signaled. When the subframes dedicated for the backhaul link are configured among MBSFN subframes, the information representing the subframes dedicated for the backhaul link can be transmitted to the mobile stations through the control channels of the MBSFN subframes.

When the subframes dedicated for the backhaul link are MBSFN subframes, the base station may signal whether the MBSFN subframes are subframes used for the original purpose (MBSFN) or subframes for the backhaul link for an LTE-A mobile station. For example, the base station may perform signaling of the combined form that functions as both an indicator indicating the MBSFN subframes and an indicator indicating the subframes dedicated for the backhaul link. Here, when the LTE-A mobile station receives MBSFN signaling outside the coverage of the relay station, the LTE-A mobile station can be configured such that the LTE-A mobile station can recognize that the corresponding subframes correspond to the subframes for MBSFN. In contrast, when the LTE-A mobile station receives the MBSFN signaling in the coverage of the relay station, the LTE-A mobile station can be configured such that the LTE-A mobile station can recognize whether the corresponding subframes correspond to the subframes dedicated for the backhaul link or the subframes for MBSFN. For example, the base station may add additional information to the MBSFN signaling to allow the LTE-A mobile station to distinguish the subframes dedicated for the backhaul link from the subframes for MBSFN. If MBSFN service is not supported in the coverage of the relay station, the LTE-A mobile station in the coverage of the relay station can be configured such that the LTE-A mobile station can recognize that the corresponding subframes correspond to the subframes dedicated for the backhaul link when the LTE-A mobile station receives MBSFN signaling.

The information representing the subframes dedicated for the backhaul link, configured in the step S300, may be informed in such a manner that a pattern is previously determined such as LTE PRACH configuration and the index of the pattern is signaled. Table 3 represents a configuration of subframes dedicated for the backhaul link.

TABLE 3

| Relay subframe configuration | system frame number | subframe number |
| --- | --- | --- |
| 0 | even | 1 |
| 1 | even | 4 |
| 2 | even | 7 |
| 3 | any | 1 |
| 4 | any | 4 |
| 5 | any | 7 |
| 6 | any | 1, 6 |
| 7 | any | 2, 7 |
| 8 | any | 3, 8 |
| 9 | any | 1, 4, 7 |
| 10 | any | 2, 5, 8 |
| 11 | any | 3, 6, 9 |
| 12 | any | 0, 2, 4, 6, 8 |
| 13 | any | 1, 3, 5, 7, 9 |
| 14 | any | 0, 1, 2, 3, 4, 5, 6, 7, 8, 9 |
| 15 | even | 9 |

When the base station signals configuration #6, the relay station or a mobile station may interpret the first and sixth subframes on every frame as subframes dedicated for the backhaul link irrespective of a system frame number. This is useful when scheduling information and subframes dedicated for the backhaul link are previously determined and used. This signaling can be transmitted via a broadcasting channel.

The base station transmits a signal to the relay station via the backhaul link in the subframes dedicated for the backhaul link, configured in step 300 (step S320). Here, the relay station may not transmit any signal to a mobile station. Accordingly, collision of the backhaul link and access link using the same frequency band can be prevented.

Meanwhile, when the base station transmits the signal to the relay station via the backhaul link in the subframes dedicated for the backhaul link in step S320, the LTE mobile station and the LTE-A mobile station perform different operations.

The LTE-A mobile station performs a predetermined operation in the subframes dedicated for the backhaul link (step S330). For example, the LTE-A mobile station recognizes the corresponding subframes as one of subframes for MBSFN and subframes dedicated for the backhaul link. When the LTE-A mobile station recognizes the corresponding subframes as the subframes dedicated for the backhaul link, the LTE-A mobile station can combine data overheard from the MBSFN subframes and data transmitted via the access link from the relay station. Furthermore, when the relay station promises the LTE-A mobile station to perform COMP (Coordinated Multi Point) operation (for example, joint transmission or selection transmission), initial transmission or re-transmission through the relay station can be performed through the MBSFN subframes.

The LTE mobile station recognizes the subframes dedicated for the backhaul link as subframes that cannot used and does not perform channel measurement for the control region or the whole region of the subframes for the backhaul link (step S340). Accordingly, it is possible to prevent a problem that a mobile station obtains an incorrect channel measurement result even when a relay station (RS) structure of the subframes dedicated for the backhaul link is changed.

Figure 9:
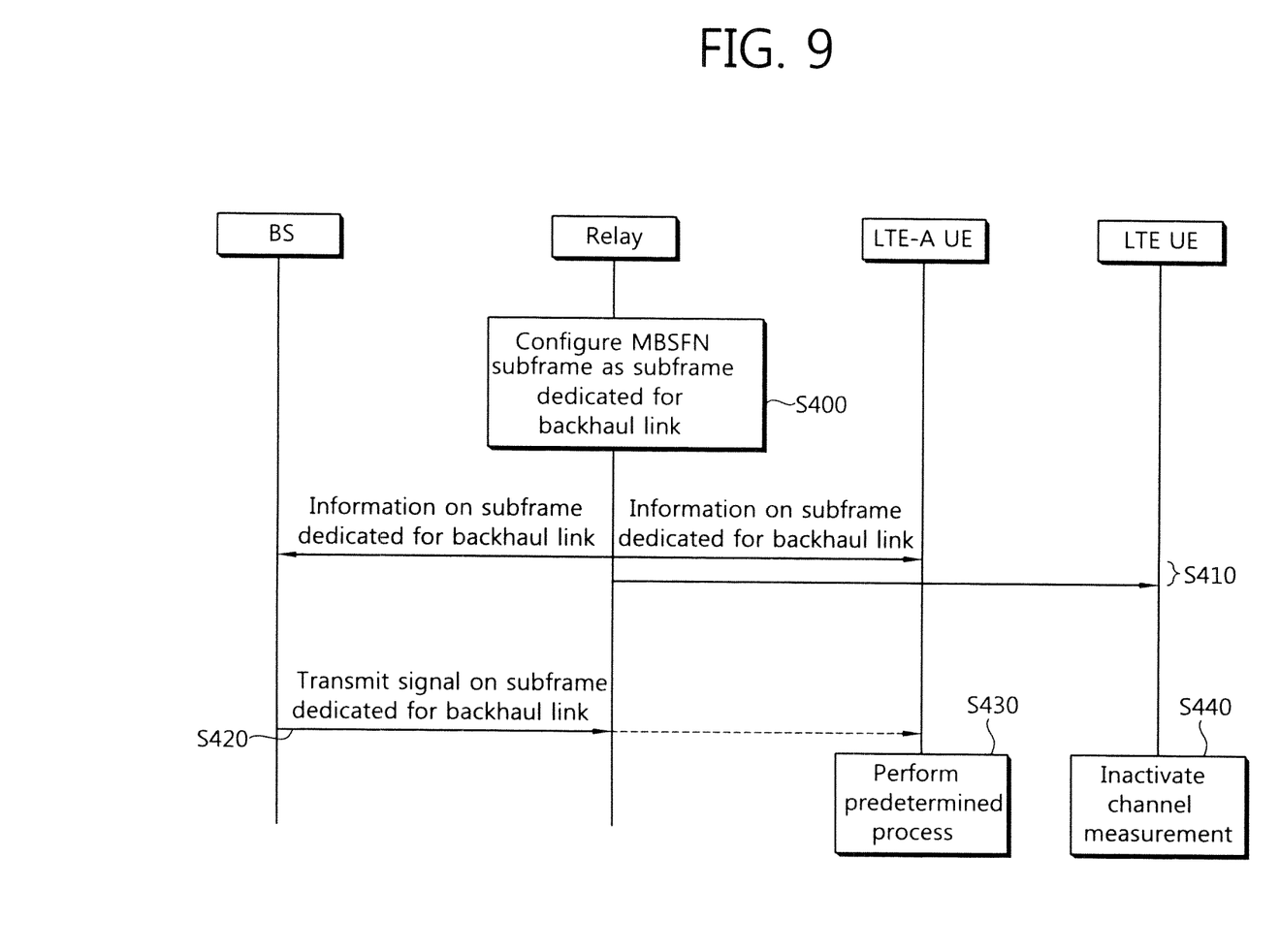
FIG. 9 is a flowchart showing a communicating method using a subframe between a base station and a relay station according to another embodiment of the present invention.

FIG. 9 is a flowchart showing a communication method using a subframe between a base station and a relay station according to another embodiment of the present invention. It is assumed that a backhaul link between the base station and the relay station and an access link between the relay station and a mobile station perform communication using the same frequency band.

Referring to FIG. 9, the relay station sets subframes dedicated for the backhaul link between the base station and the relay station (step S400). Here, MBSFN subframes may be configured as the subframes dedicated for the backhaul link. The relay station informs the base station and mobile stations of information representing the subframes dedicated for the backhaul link, configured in step S400 (step S410). The relay station receives a signal from the base station through the backhaul link on the subframes dedicated for the backhaul link, which are configured in step S400 (step S420). Meanwhile, when the relay station receives the signal from the base station through the backhaul link in the subframes dedicated for the backhaul link in step S420, an LTE mobile station and an LTE-A mobile station perform different operations. The LTE-A mobile station performs a predetermined operation in the subframes dedicated for the backhaul link (step S430). The LTE mobile station recognizes the subframes dedicated for the backhaul link as subframes that cannot be used and does not perform channel measurement for the control region or the whole region of the subframes for the backhaul link (step S440).

The communication method shown in FIG. 9 is identical to the communication method shown in FIG. 8 except that the base station signals the subframes dedicated for the backhaul link in the communication method shown in FIG. 8 while the relay station signals the subframes dedicated for the backhaul link in the communication method shown in FIG. 9.

Figure 10:
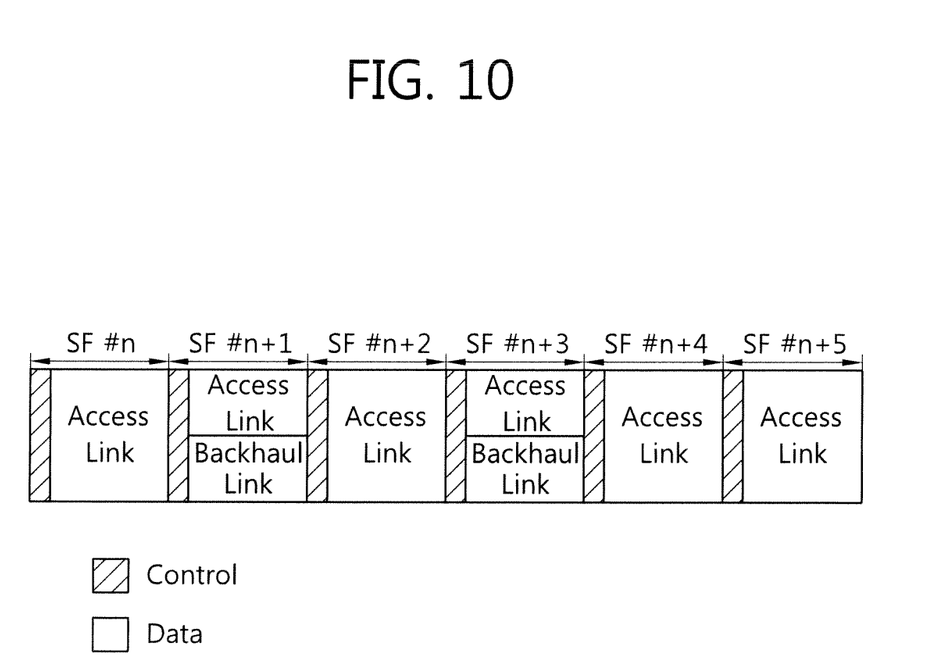
FIG. 10 illustrates a time resource allocation method according to another embodiment of the present invention.

FIG. 10 illustrates a time resource allocation method according to another embodiment of the present invention. Though FIG. 10 illustrates downlink transmission for convenience of explanation, the technical spirit of the present invention can be applied to uplink transmission.

Referring to FIG. 10, subframes #n, #n+2, #n+4 and #n+5 are configured as subframes dedicated for an access link and subframes #n+1 and #n+3 are configured as subframes for the access link and a backhaul link.

Figure 11:
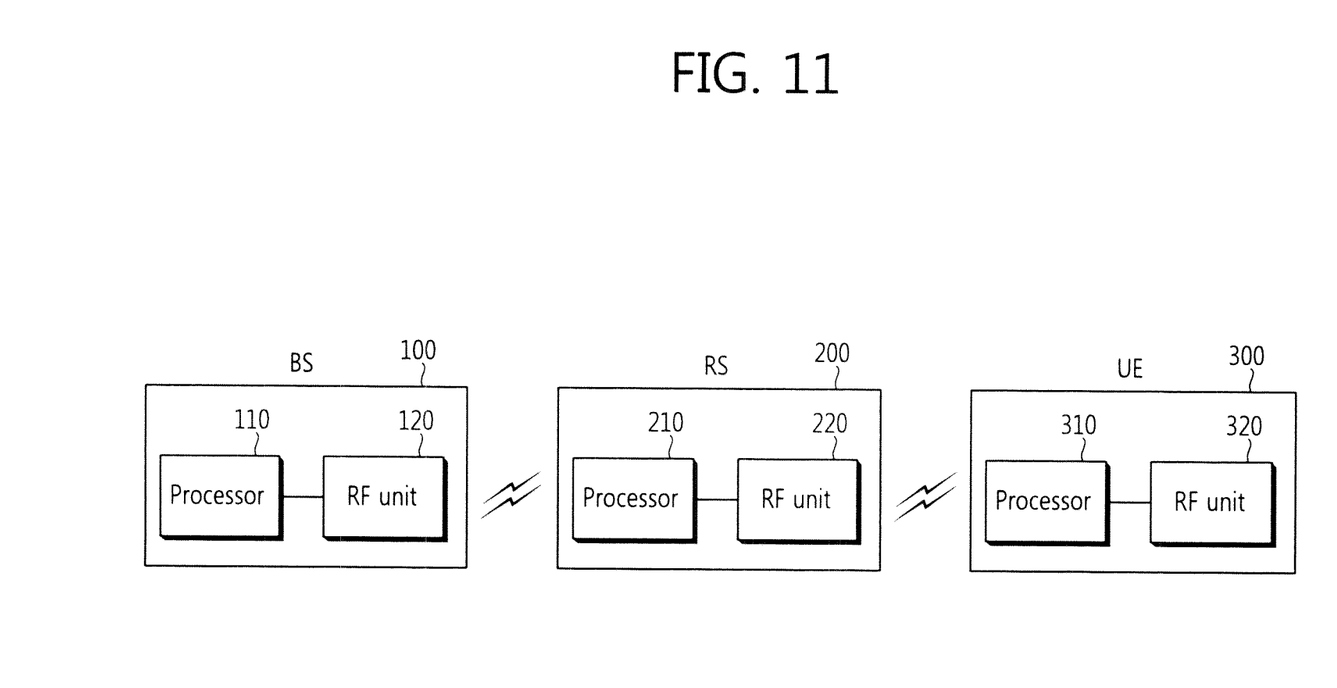
FIG. 11 is a block diagram of a wireless communication system including a relay station according to an embodiment of the present invention.

FIG. 11 is a block diagram of a wireless communication system including a relay station according to an embodiment of the present invention.

Referring to FIG. 11, the wireless communication system includes a base station 100, a relay station 200, and a mobile station 300. The mobile station 300 may be an LTE mobile station (mobile station that is designed without considering the relay station and supports Release 8) or an LTE-A mobile station (mobile station designed in consideration of the relay station). The base station 100 includes a processor 110 and an RF (Radio Frequency) unit 120. The RF unit 120 of the base station 100 transmits/receives radio signals. The processor 110 configures subframes dedicated for a backhaul link, transmits information representing the subframes dedicated for the backhaul link to the relay station 200 and/or the mobile station 300 and transmits a signal to the relay station 200 through the subframes dedicated for the backhaul link. The relay station 200 includes an RF unit 220 and a processor 210. The RF unit 220 of the relay station 200 transmits/receives radio signals. The processor 210 configures subframes dedicated for the backhaul link, transmits information representing the subframes to the base station 100 and/or the mobile station 300 and transmits a signal from the base station 100 through the subframes. The mobile station 300 includes an RF unit 320 and a processor 310. The RF unit 320 of the mobile station 300 transmits/receives radio signals. The processor 310 of the LTE mobile station receives information representing the subframes dedicated for the backhaul link from the base station or the relay station and does not perform channel measurement in at least a part of the subframes dedicated for the backhaul link. The processor 320 of the LTE-A mobile station receives information representing the subframes dedicated for the backhaul link from the base station or the relay station and performs a predetermined process in the subframes dedicated for the backhaul link. For example, the processor 320 of the LTE-A mobile station overhears a signal transmitted through the backhaul link in the subframes dedicated for the backhaul link and combines the overheard signal with a signal transmitted through the access link.

The present invention can be embodied as hardware, software or combination thereof. When the invention is embodied as hardware, the invention can be implemented in ASIC (Application Specific Integrated Circuit), DSP (Digital Signal Processing), PLD (Programmable Logic Device), FPGA (Field Programmable Gate Array), processor, controller, microprocessor, other electronic units or combinations thereof, which are designed to perform the aforementioned functions. When the invention is embodied as software, the invention can be implemented in a module performing the aforementioned functions. Software can be stored in a memory unit and executed by a processor. The memory unit or the processor can employ various means well-known to those skilled in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing communication in a wireless communication system supporting a radio frame, each radio frame comprising 10 subframes with indexes 0 to 9, the method performed at a base station and comprising:
    transmitting, at the base station a system information block (SIB) including a bitmap to a user equipment,
    wherein each bit of the bitmap indicates whether a corresponding backhaul subframe is allocated as a Multimedia Broadcast Multicast Service Single Frequency Network (MBSFN) subframe so that the user equipment considers the corresponding backhaul subframe as the MBSFN subframe,
    wherein the bitmap is set to six bits when an allocation of the MBSFN subframe is performed based on one radio frame, and
    wherein $1^{st}$, $2^{nd}$, $3^{rd}$, $4^{th}$, $5^{th}$, and $6^{th}$ bits of the six bits correspond to subframes with indexes 1, 2, 3, 6, 7 and 8, respectively;
    transmitting, at the base station to a relay station, control information indicating at least one subframe dedicated for a backhaul ink between the base station and the relay station,
    wherein the at least one subframe dedicated for the backhaul link is configured as the MBSFN subframe; and
    transmitting, at the base station to the relay station, at least one downlink subframe as the MBSFN subframe on the at least one subframe dedicated for the backhaul link.

2. The method of claim 1, wherein the bitmap is set to 24 bits when the allocation of the MBSFN subframe is performed based on 4 consecutive radio frames.

3. The method of claim 1, wherein the SIB includes information on a period of a radio frame to which the MBSFN subframe is allocated.

4. A base station performing communication in a wireless communication system supporting a radio frame, each radio frame comprising 10 subframes with indexes 0 to 9, the base station comprising:
    a radio frequency unit configured to transmit and receive a radio signal; and
    a processor coupled to the radio frequency unit and configured to:
        transmit a system information block (SIB) including a bitmap to a user equipment,
        wherein each bit of the bitmap indicates whether a corresponding backhaul subframe is allocated as a Multimedia Broadcast Multicast Service Single Frequency Network (MBSFN) subframe so that the user equipment considers the corresponding backhaul subframe as the MBSFN subframe,
        wherein the bitmap is set to six bits when an allocation of the MBSFN subframe is performed based on one radio frame, and
        wherein $1^{st}$, $2^{nd}$, $3^{rd}$, $4^{th}$, $5^{th}$, and $6^{th}$ bits of the six bits correspond to subframes with indexes 1, 2, 3, 6, 7 and 8, respectively;
        transmit, to a relay station, control information indicating at least one subframe dedicated for a backhaul link between the base station and the relay station,
        wherein the at least one subframe dedicated for the backhaul link is configured as the MBSFN subframe; and
        transmit at least one downlink subframe to the relay station on the at least one subframe dedicated for the backhaul link.

5. The base station of claim 4, wherein the bitmap is set to 24 bits when the allocation of the MBSFN subframe is performed based on 4 consecutive radio frames.

6. The base station of claim 4, wherein the bitmap is included in a system information block (SIB), and the SIB includes information on a period of a radio frame to which a MBSFN subframe is allocated.

* * * * *